United States Patent
Korhonen et al.

(10) Patent No.: US 8,360,211 B2
(45) Date of Patent: Jan. 29, 2013

(54) HOISTING MACHINE INCLUDING A MEASURING ARRANGEMENT AND ELEVATOR SYSTEM CONTAINING THE SAME

(75) Inventors: Tuukka Korhonen, Tuusula (FI); Asmo Tenhunen, Hyvinkää (FI); Jussi Lähteenmäki, Hyvinkää (FI); Jussi Huppunen, Vantaa (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 13/428,517

(22) Filed: Mar. 23, 2012

(65) Prior Publication Data

US 2012/0181119 A1    Jul. 19, 2012

Related U.S. Application Data

(63) Continuation of application No. PCT/FI2010/050741, filed on Sep. 24, 2010.

(30) Foreign Application Priority Data

Sep. 25, 2009  (FI) ..................... 20095986
Sep. 29, 2009  (FI) ..................... 20095991

(51) Int. Cl.
*B66B 1/34* (2006.01)
(52) U.S. Cl. ..................... 187/391; 187/289

(58) Field of Classification Search .................. 187/277, 187/278, 289, 290, 293, 391–393
See application file for complete search history.

(56) References Cited

U.S. PATENT DOCUMENTS

| | | | |
|---|---|---|---|
| 5,052,522 A * | 10/1991 | Nakai et al. ................... | 187/393 |
| 5,886,308 A | 3/1999 | Ericson et al. | |
| 5,962,948 A | 10/1999 | Hakala et al. | |
| 6,325,177 B1 * | 12/2001 | Fargo et al. ................... | 187/258 |
| 6,328,136 B1 * | 12/2001 | Tauchi et al. ................. | 187/391 |
| 6,344,089 B1 * | 2/2002 | Tauchi et al. ................. | 187/391 |
| 7,195,107 B2 * | 3/2007 | Gauthier et al. .............. | 187/259 |
| 7,637,357 B2 * | 12/2009 | Nakagawa et al. ........... | 187/393 |
| 7,971,688 B2 * | 7/2011 | Perala et al. .................. | 187/293 |
| 2004/0174161 A1 | 9/2004 | Tausch et al. | |
| 2006/0243537 A1 | 11/2006 | Finn et al. | |

FOREIGN PATENT DOCUMENTS

| | | |
|---|---|---|
| EP | 1447368 A1 | 8/2004 |
| JP | 11-100180 A | 4/1999 |

\* cited by examiner

*Primary Examiner* — Anthony Salata
(74) *Attorney, Agent, or Firm* — Birch, Stewart, Kolasch & Birch, LLP

(57) ABSTRACT

A hoisting machine and an elevator system including the hoisting machine are provided. The hoisting machine includes a measuring arrangement for determining the position and/or movement of the rotor of a hoisting machine. The measuring arrangement includes a magnetic band whose magnetic property is so implemented that it varies in the longitudinal direction of the band.

7 Claims, 6 Drawing Sheets

2: Electric machine

8: Magnetic band reader

13: Magnetic-band reading circuit

23: Inverter part

24: Rectifier part

25: Alternating power source

26: Controller

2: Electric machine

8: Magnetic band reader

9: Stationary body part

16: Frequency converter

20: Elevator control unit

25: Alternating power source

30: Door zone sensor

US 8,360,211 B2

HOISTING MACHINE INCLUDING A MEASURING ARRANGEMENT AND ELEVATOR SYSTEM CONTAINING THE SAME

CROSS REFERENCE TO RELATED APPLICATIONS

This application is a Continuation of PCT International Application No. PCT/FI2010/050741 filed on Sep. 24, 2010, which claims priority under 35 U.S.C. §119(a) to Patent Application Nos. 20095986 and 20095991 filed in Finland on Sep. 25, 2009 and Sep. 29, 2009, respectively, all of which are hereby expressly incorporated by reference into the present application.

FIELD OF THE INVENTION

The present invention relates to the measurement of position and/or movement and in particular to the measurement of the position and/or movement of the rotor of an electric machine.

DESCRIPTION OF PRIOR ART

For motor torque adjustment, it is necessary to have information regarding the position of a magnetic pole of the rotor. In addition, for the adjustment of motor movement, feedback is needed about the rotary motion of the rotor.

The position of a magnetic pole of the rotor has traditionally been detected by means of an absolute sensor measuring position data, such as a resolver. The measuring accuracy of a resolver is fairly low. Moreover, the resolver, like other absolute sensors, generally has to be mounted on the motor shaft, which, due to the structure of the motor, may be a difficult task. An absolute sensor mounted on the shaft may also increase the axial length of the motor.

For the measurement of position data and/or movement, e.g. an optical encoder is also used. However, the operation of an optical encoder is easily disturbed e.g. due to impurities or smoke. In addition, the optical encoder may be difficult to mount in conjunction with the motor due to lack of space.

OBJECT OF THE INVENTION

The object of the present invention is to solve some of the above-mentioned problems. To this end, the invention discloses a measuring arrangement as defined in claim 1 for the measurement of the position and/or movement of the rotor of an electric machine, a hoisting machine as defined in claim 10, an electric drive as defined in claim 16, an elevator system as defined in claim 17 and an elevator system as defined in claim 18. Preferred embodiments of the invention are disclosed in the dependent claims.

In the measuring arrangement of the invention, rotor position and/or movement data is read using a specific magnetic band. The measuring arrangement of the invention can be flexibly disposed in a desired place in the electric machine.

BRIEF DESCRIPTION OF THE INVENTION

The measuring arrangement of the invention comprises a magnetic band, the magnetic property of said magnetic band being implemented to be variable in the longitudinal direction of the band. The magnetic band is attached to the rotating part of the electric machine, in such a way that the magnetic band is fitted to circle around the rotational axis of the rotor. The measuring arrangement also comprises a reader which senses the aforesaid magnetic property varying in the longitudinal direction of the magnetic band, said reader being mounted on a stationary part of the electric machine in the immediate vicinity of the magnetic band. The magnetic band preferably has successive portions following each other in the longitudinal direction of the band, each two of said successive portions having magnetic properties differing from each other. In one embodiment, the magnetic band has at least two parallel channels, each one of said channels containing successive portions following each other in the longitudinal direction of the band, and different parallel channels differ from each other in respect of the disposition and/or frequency of occurrence of the said successive portions following each other. Such an implementation makes it possible to identify the direction of rotation of the band.

In a preferred embodiment of the invention, the magnetic band is placed on a substantially circular ring around the rotational axis of the rotor.

In an embodiment of the invention, the magnetic fields generated by two successive portions following each other in the longitudinal direction of the magnetic band differ from each other in respect of intensity. In an embodiment of the invention, the magnetic fields generated by two successive portions following each other in the longitudinal direction of the magnetic band are oriented in mutually opposite directions.

In an implementation of the invention, the intensity of the magnetic field produced by the magnetic band varies in the longitudinal direction of the band substantially sinusoidally. Such a solution is advantageous when absolute position is to be determined by means of the magnetic band.

In a preferred embodiment of the invention, the reader is arranged to produce a measurement signal on the basis of the magnetic property and/or change in the magnetic property of the magnetic band portion located in the immediate vicinity of the reader. The measuring arrangement preferably comprises a magnetic-band reading circuit, which has an input for the measurement signal produced by the aforesaid reader sensing the magnetic property, and which reading circuit has an output for data representing the position and/or movement of the rotor of the electric machine.

The rotating part of the hoisting machine of the invention comprises a drive sheave rotatably mounted on the body part of the hoisting machine. The hoisting machine also comprises a drive-sheave protection plate, which is secured to the body part of the hoisting machine. The drive-sheave protection plate extends from the body part of the hoisting machine to the side of the drive sheave so that the drive sheave is housed in the space remaining between the protection plate and the body part. The hoisting machine is provided with a measuring arrangement as described above, in such manner that the magnetic band comprised in the measuring arrangement is fitted in conjunction with the rotating part of the hoisting machine while the reader comprised in the measuring arrangement is fitted in conjunction with the drive-sheave protection plate. The drive sheave is preferably hollow, and the magnetic band is preferably fitted inside the hollow drive sheave. In this way, a very compact hoisting machine is achieved, and the external dimension/dimensions of the hoisting machine can be reduced. In a preferred embodiment of the invention, the drive sheave is supported on the body part of the hoisting machine via a bearing. This bearing is held in a bearing housing which rotates with the drive sheave and is integrated in the same body with the drive sheave.

In an implementation, the bearing housing is fitted inside a hollow drive sheave, and the bearing housing is provided with a machined mounting surface for the magnetic band. The magnetic band can be secured directly to the mounting surface machined in the bearing housing; however, in a preferred embodiment of the invention, the magnetic band is secured to a separate mounting ring and the mounting ring is secured to the mounting surface machined in the bearing housing.

The drive-sheave protection plate is secured to the body part of the hoisting machine by at least two different points to increase the rigidity of the hoisting machine. Such a stiffening solution is advantageous particularly in the case of a substantially flat hoisting machine, whose total dimension in the axial direction is smaller than the total dimension of the hoisting machine in the radial direction.

The electric drive of the invention comprises an electric machine and a frequency converter for producing a variable-amplitude and variable-frequency supply voltage for controlling the electric machine. Fitted in the electric machine is a measuring arrangement as described above for measuring the position and/or movement of the rotor of the electric machine. The electric machine preferably comprises a synchronous motor. In a preferred embodiment of the invention, the rotating part of the electric machine comprises a mounting surface made for the magnetic band, which mounting surface revolves about the rotational axis of the rotor, the distance of said mounting surface from the rotational axis of the rotor being substantially constant. In an implementation, a data transfer connection is provided between the magnetic band reader and the frequency converter for transmitting the data representing the position and/or movement of the rotor of the electric machine to the frequency converter.

The elevator system of the invention comprises an electric drive as described above for controlling the movement of the elevator car. An elevator control unit is arranged to determine the position of the elevator car in the elevator shaft, using for this determination the data representing the movement and/or position of the rotor of the electric machine obtained from the magnetic band reader.

The elevator system of the invention is implemented using a hoisting machine as described above.

The magnetic band of the invention can preferably be fitted on the inside but also on the outside of the electric machine e.g. in a place that is the most advantageous in respect of space-saving or of structural properties of the electric machine. Likewise, the point of attachment of the reader relative to the magnetic band can be selected flexibly, and the reader can be placed on the outside or on the inside of the electric machine.

In respect of reliability, measurement based on a magnetic field is more advantageous than e.g. optical measurement, because the passage of a magnetic field is not disturbed due to impurities or e.g. smoke in the way the passage of electromagnetic radiation is disturbed in measuring devices based on optics. Also, the service life of the LEDs used in optical sensors is quite limited, e.g. about 100 000 hours of usage. Moreover, the magnetic band of the invention can in many cases be implemented as a fairly long band, because it can be fitted around the rotational axis of the rotor on a circle of a substantially larger radius than would be possible if prior-art sensors were used. The large length of the magnetic band makes it possible for the magnetic band to comprise in the longitudinal direction of the band a large amount of e.g. cyclically varying information. The large amount of information used in the measurement improves the measuring accuracy of the magnetic band.

The above summary as well as the additional features and advantages of the invention explained below will be better understood from the following description.

BRIEF DESCRIPTION OF THE DRAWINGS

In the following, the invention will be described in more detail by referring to embodiment examples, which in themselves are not restrictive of the sphere of application of the invention, and to the attached drawings, wherein FIGS. 1$a$-1$c$ visualize a measuring arrangement according to the invention FIG. 2 visualizes the disposition of the measuring arrangement of the invention FIG. 3 visualizes an electric drive according to the invention FIG. 4 visualizes an elevator system according to the invention FIG. 5 visualizes a magnetic band according to the invention FIG. 6 visualizes a hoisting machine according to the invention

DETAILED DESCRIPTION OF THE PREFERRED EMBODIMENTS OF THE INVENTION

Figure 1A:
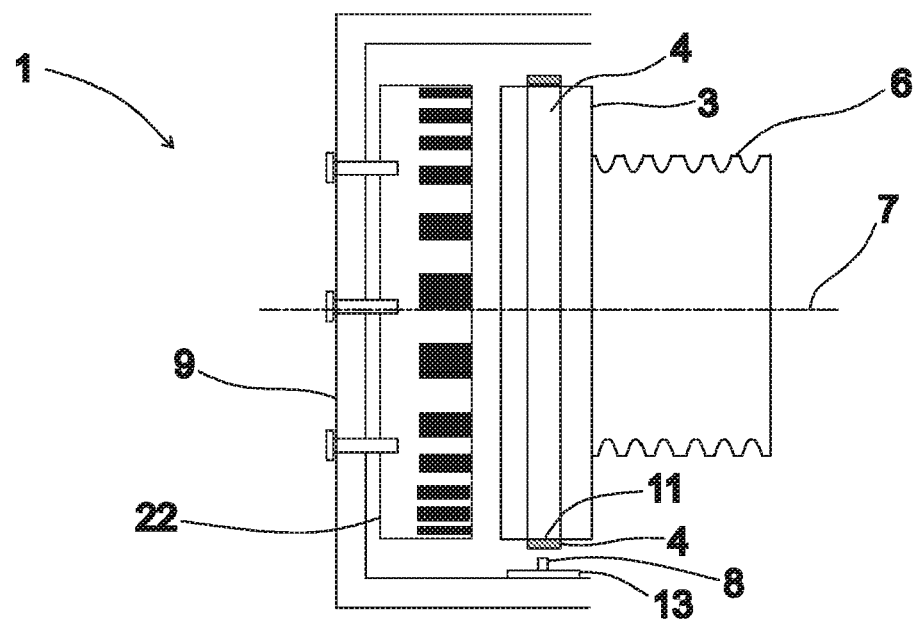
Figure 1B:
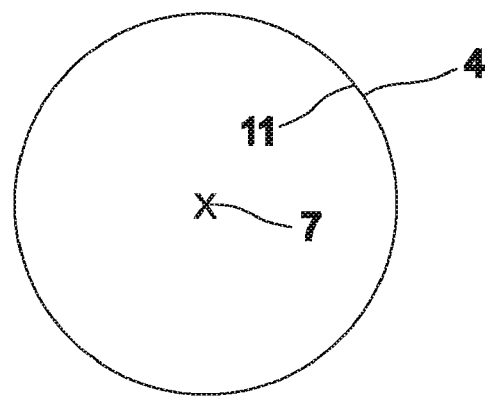
Figure 1C:
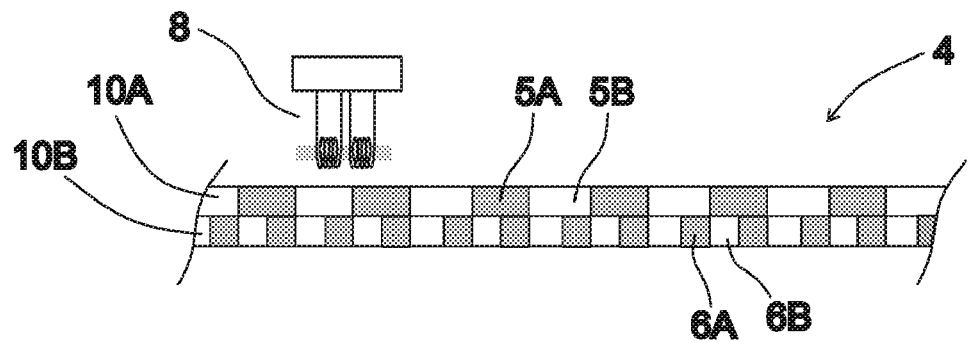

FIG. 1$a$ presents a side view of an elevator hoisting machine 2 with a measuring arrangement 1 according to the invention fitted in it for measuring the position and/or movement of the rotor 3 of the hoisting machine 2. FIG. 1$b$ represents a magnetic band 4 comprised in the measuring arrangement as seen in front view. FIG. 1$c$ presents a more detailed view of a part of a magnetic band 4 according to the invention and a reader 8 comprised in the measuring arrangement which senses the magnetic property of the magnetic band 4.

The magnetic band 4 is attached to the rotating part of the elevator hoisting machine 2, to the circumference of the rotor 3. For this purpose, the circumference of the rotor 3 is provided with a mounting surface 11 for the magnetic band 4, which mounting surface 11 forms a circle around the rotational axis 7 of the rotor and whose distance from the rotational axis 7 of the rotor is substantially constant. The magnetic band 4 is placed on the mounting surface 11 on a substantially circular ring 11 around the rotational axis 7 of the rotor. The magnetic band 4 secured to the plane 11 preferably by gluing. The magnetic band reader 8 is placed on a circuit board 13, and the reader 8 is attached to a stationary body part 9 of the elevator hoisting machine 2, in the immediate vicinity of the magnetic band 4.

As visualized in FIG. 1$c$, the magnetic band 4 consists of two parallel channels 10A, 10B, and each one of these channels comprises successive portions 5A, 5B; 6A, 6B following each other in the longitudinal direction of the band 4. The magnetic band 4 is so implemented that the magnetic fields produced by each two successive portions 5A, 5B; 6A, 6B following each other are mutually oppositely oriented. For this reason, the magnetic band comprises e.g. ferromagnetic material whose internal magnetic moments have been oriented by means of an intensive external magnetic field in each two successive band 4 portions 5A, 5B; 6A, 6B following each other in mutually opposite directions. The successive portions 5A, 5B; 6A, 6B could also be implemented e.g. in such manner that in each two successive portions 5A, 5B; 6A, 6B following each other the absolute values of the magnetic field intensity differ from each other or that the magnetic field intensity is zero in one of the two successive portions 5A, 5B; 6A, 6B.

In channel 10B, the frequency of occurrence of successive portions 6A, 6B following each other is greater than the frequency of occurrence of successive portions 5A, 5B in channel 10A. The magnetic band reader 8 has two measuring heads, the first one of which reads the successive portions 5A, 5B following each other in the longitudinal direction of the band in the first channel 10A of the magnetic band while the second one reads the successive portions 6A, 6B following each other in the longitudinal direction of the band in the second channel 10B of the magnetic band. The reading function is here implemented using inductive coils producing a measurement signal in which a pulse is detected each time when a change occurs in the magnetic field of the magnetic band under the coil. Instead of coils, the measuring head could also be implemented using other sensors reacting to magnetic field, such as hall sensors or magneto-resistive sensors. The velocity of revolution of the magnetic band can be determined e.g. by calculating the time interval between measurement signal pulses or the number of measurement signal pulses per unit of time. As the frequencies of occurrence of successive portions 5A, 5B; 6A, 6B following each other in the channels 10A, 10B of the magnetic band differ from each other, it is possible, by comparing the measurement signals of the coils reading different channels 10A, 10B, to determine, besides the velocity of revolution of the magnetic band 5, also the direction of revolution of the magnetic band 4 relative to the magnetic band reader 8. A two-channel measurement signal like this revealing the direction of revolution could also be implemented by placing the successive portions following each other in different channels 10A, 10B of the magnetic band 4 so that they have a given phase shift relative to each other, in which case the direction of revolution could be detected by comparing the phase shifts in the measurement signals of the two channels 10A, 10B.

By providing the above-described magnetic band 4 with additional channels/successive portions, it is also possible to read the absolute position of the rotor 3 by means of the magnetic band. In addition, it is possible to include in the magnetic band one or more reference points where the position and/or frequency of occurrence and/or magnetic properties of successive portions 5A, 5B; 6A, 6B of the magnetic band 4 differ from the rest of the magnetic band. In this case, rotor position data is determined by integrating the pulses obtained from the magnetic band reader, and the integrated position data is corrected at the aforesaid one or more reference points.

Figure 5:
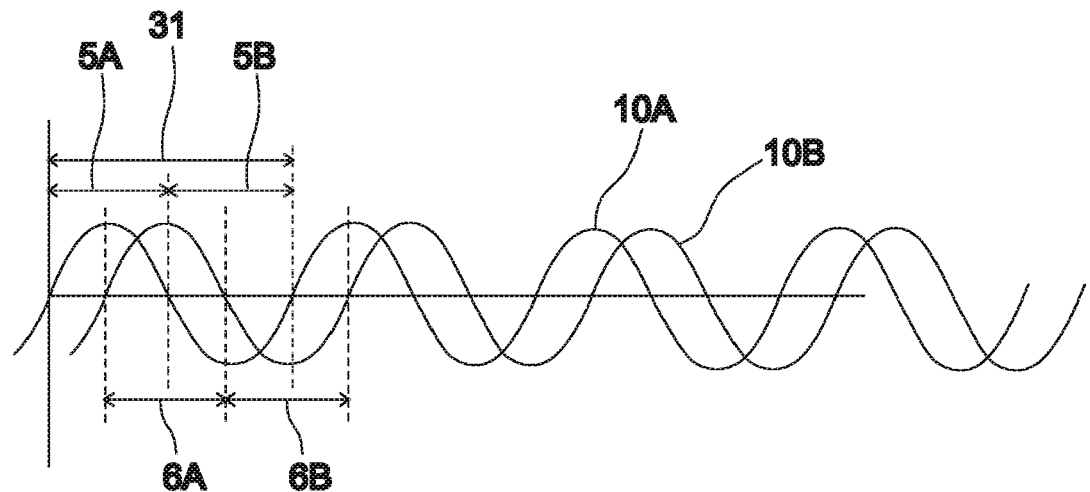

FIG. 5 represents a magnetic band according to an embodiment of the invention, which comprises two parallel channels 10A, 10B. The intensity of the magnetic field produced by the magnetic band varies in both channels substantially sinusoidally in the longitudinal direction of the band. The intensity of the magnetic field is read from each channel 10A, 10B e.g. by means of a magneto-resistive sensor or a hall sensor. Thus, two measurement signals varying sinusoidally in the longitudinal direction of the magnetic band 4 are obtained. The cycle time 31 of the sinusoidal variation of the magnetic field is the same in both channels 10A, 10B, but there is a 90-degree phase shift in the sinusoidal variation of the magnetic field between the two channels. Thus, by comparing the sinusoidal measurement signals of the two channels 10A, 10B, it is possible to determine the position of the reader 8 relative to the magnetic band 4 in the part of the magnetic band determined by the cycle time 31 of the sinusoidal measurement signals. In an embodiment of the invention, the number of sinusoidally varying cycles in the magnetic band has been selected to be the same as the number of pole pairs in the motor.

Figure 2:
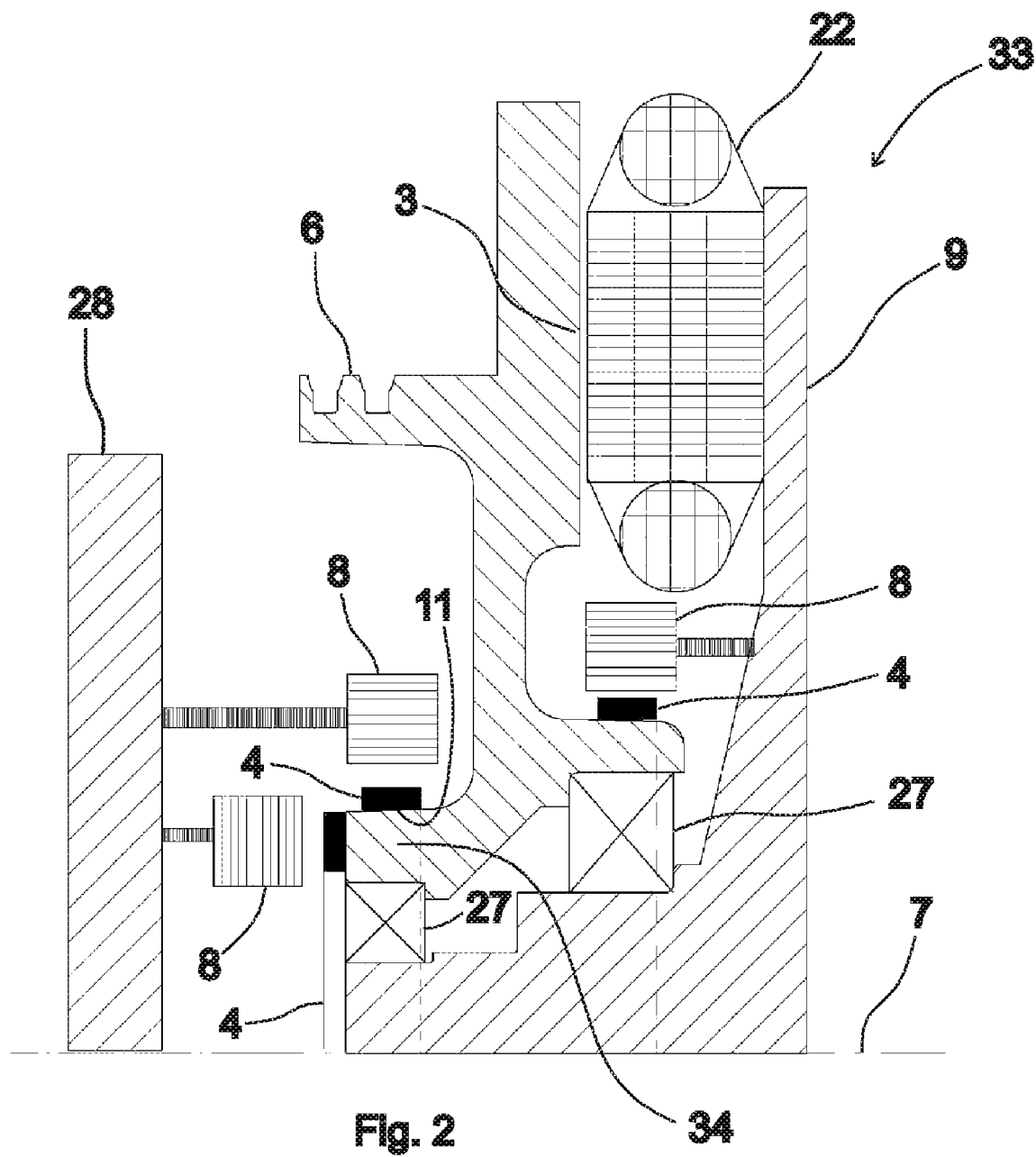

FIG. 2 shows a sectional drawing of an elevator hoisting machine 2 according to the invention, which comprises combinations of a magnetic band 4 and a reader 8 e.g. according to the embodiment examples visualized in FIG. 1 and/or FIG. 5, placed in different parts. The motor in FIG. 2 is a permanent-magnet synchronous motor, in which the permanent magnets are mounted on the rotor 3. The drive sheave 6 of the elevator is integrated with the rotor 3. The air gap between the stator 22 and the rotor 3 is substantially parallel to the rotational axis 7 of the rotor. The rotor 3 and the drive sheave 6 are rotatably supported by bearings 27 on the body part of the hoisting machine. The bearing 27 is mounted in a bearing housing 34, which is integrated in the same body with the drive sheave 6.

The drive-sheave protection plate 28 secured to the body part 33 of the hoisting machine extends to the side of the drive sheave 6 so that the drive sheave 6 is housed in the space remaining between the protection plate 28 and the body part 33.

As appears from FIG. 2, the magnetic band reader 8 can be secured e.g. to the mounting frame 9 of the stator 22 or to the stationary drive-sheave protection plate 28. The magnetic band 4 is fixed by gluing to the rotating part of the machine 2, so that the magnetic band 4 revolves about the rotational axis 7 of the rotor. The magnetic band can be disposed as shown in FIG. 2 e.g. so that the magnetic band 4 is read in a substantially horizontal or vertical direction. The magnetic band 4 is preferably placed outside the magnetic circuit formed by the rotor 3, the stator 22 and the air gap between these, thus ensuring that the magnetic flux rotating in the motor will not disturb the measurement of rotor position and/or movement.

Figure 3:
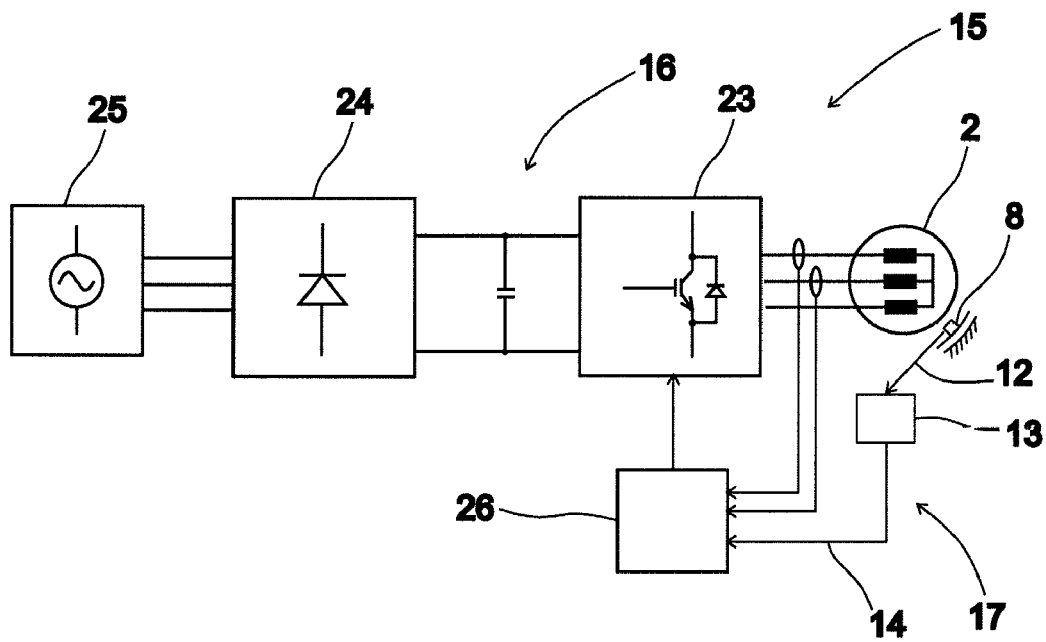

FIG. 3 represents an electric drive 15 according to the invention, comprising an electric machine 2 and a frequency converter 16. The electric machine 2 comprises a synchronous motor. The frequency converter 16 contains a rectifier part 24 and an inverter part 23, which comprise electronic switches for supplying power from an alternating power source 25 to the synchronous motor 2. The rectifier part 24 rectifies the constant-frequency alternating voltage from the alternating power source 25, producing a direct voltage to the direct-voltage intermediate circuit of the frequency converter. The inverter part 23 again converts the direct voltage of the direct-voltage intermediate circuit into a variable-amplitude and variable-frequency supply voltage for controlling the synchronous motor 2. Fitted in the electric machine 2 is a measuring arrangement according to the embodiment examples of e.g. FIG. 1 and/or FIG. 5 for measuring the position and/or movement of the rotor of the electric machine. Therefore, a data transfer connection 17 is provided between the frequency converter 16 and the magnetic band reader 8 attached to a stationary part of the electric machine 2 to allow the data indicating the position and/or movement of the rotor of the electric machine 2 to be passed to the frequency converter 16. The measuring arrangement comprises a magnetic-band reading circuit 13, which has an input for the two-channel measurement signal 12 produced by the magnetic band reader 8. The magnetic-band reading circuit 13 also has an output for data 14 representing the position and/or movement of the rotor 3 of the electric machine. The magnetic-band reading circuit 13 has been arranged to process the measurement signal 12 of the magnetic band reader in such a way that the data 14 representing the position and/or movement of the rotor 3 of the electric machine is converted into a form understandable to the controller 25 of the frequency converter 16. The said rotor position and/or movement data 14 is used for both torque control and velocity control of the frequency converter.

Figure 6:
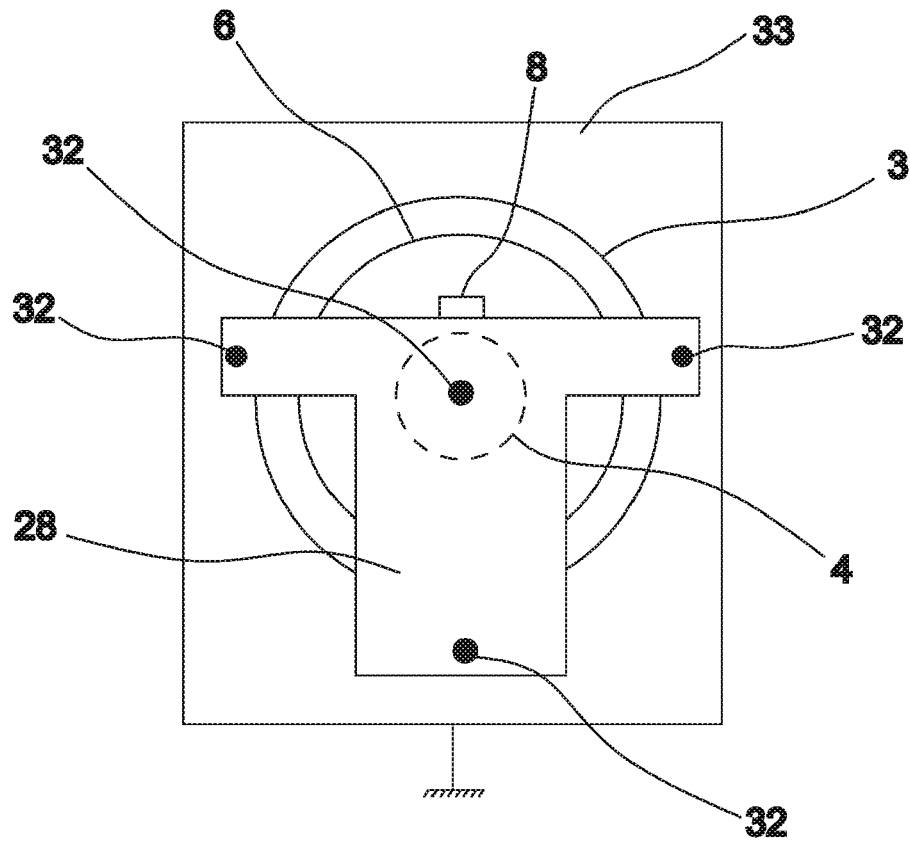

FIG. 6 visualizes an elevator hoisting machine according to the invention in a simplified form. Except for the simplified formulation, the hoisting machine in FIG. 6 is mainly similar to the one illustrated in FIG. 2; however, FIG. 6 gives a more detailed illustration of the disposition and securing of the drive-sheave protection plate 28 in the hoisting machine, among other things. FIG. 6 also visualizes the disposition of the magnetic band 4 and reader 8 already illustrated in FIG. 2, but now as seen from another direction.

The rotating part of the hoisting machine comprises the drive sheave 6, which is supported by bearings on the body part 33 of the hoisting machine. The axial total dimension of the hoisting machine is smaller than the radial total dimension of the hoisting machine, so the hoisting machine is substantially flat in the direction of the rotational axis of the hoisting machine. The drive-sheave protection plate 28 secured to the body part 33 of the hoisting machine extends to the side of the drive sheave 6, so that the drive sheave 6 is housed in the space remaining between the protection plate 28 and the body part 33. The drive-sheave protection plate 28 is secured by three different points 32 to the body part of the hoisting machine to increase the rigidity of the hoisting machine. The magnetic band 4 comprised in the measuring arrangement of the invention is fitted in conjunction with the rotating part of the hoisting machine, and the reader 8 comprised in the measuring arrangement is fitted in conjunction with the drive-sheave protection plate 28.

The bearing suspension has been implemented by mounting the bearing 27 in a rotating bearing housing 34. The bearing housing 34, the drive sheave 6 and the rotor 3 are integrated in the same body. The bearing housing 34 is fitted inside the hollow drive sheave 6. Machined in the bearing housing is a ledge with a mounting surface for the attachment of the magnetic band 4.

Figure 7:
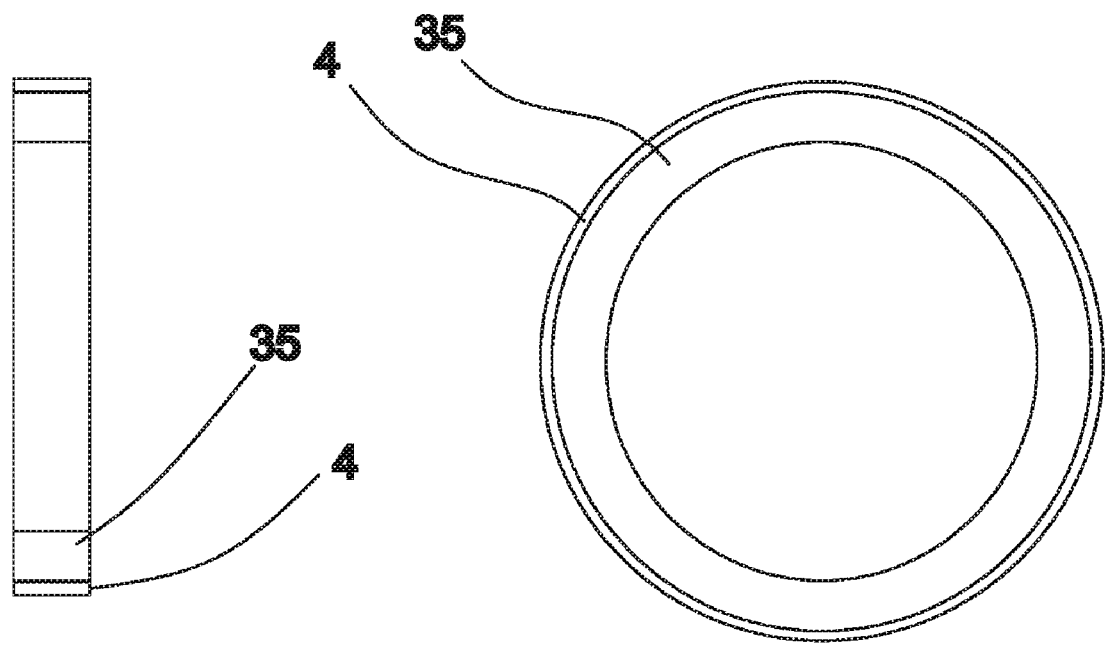
FIG. 7 shows a magnetic-band mounting ring according to the invention as seen from two different directions.

The hoisting machine in FIG. 6 differs from the hoisting machine in FIG. 2 in that the magnetic band 4 is secured to a separate mounting ring 35 according to FIG. 7, and the mounting ring is further secured to the bearing housing 34.

Figure 4:
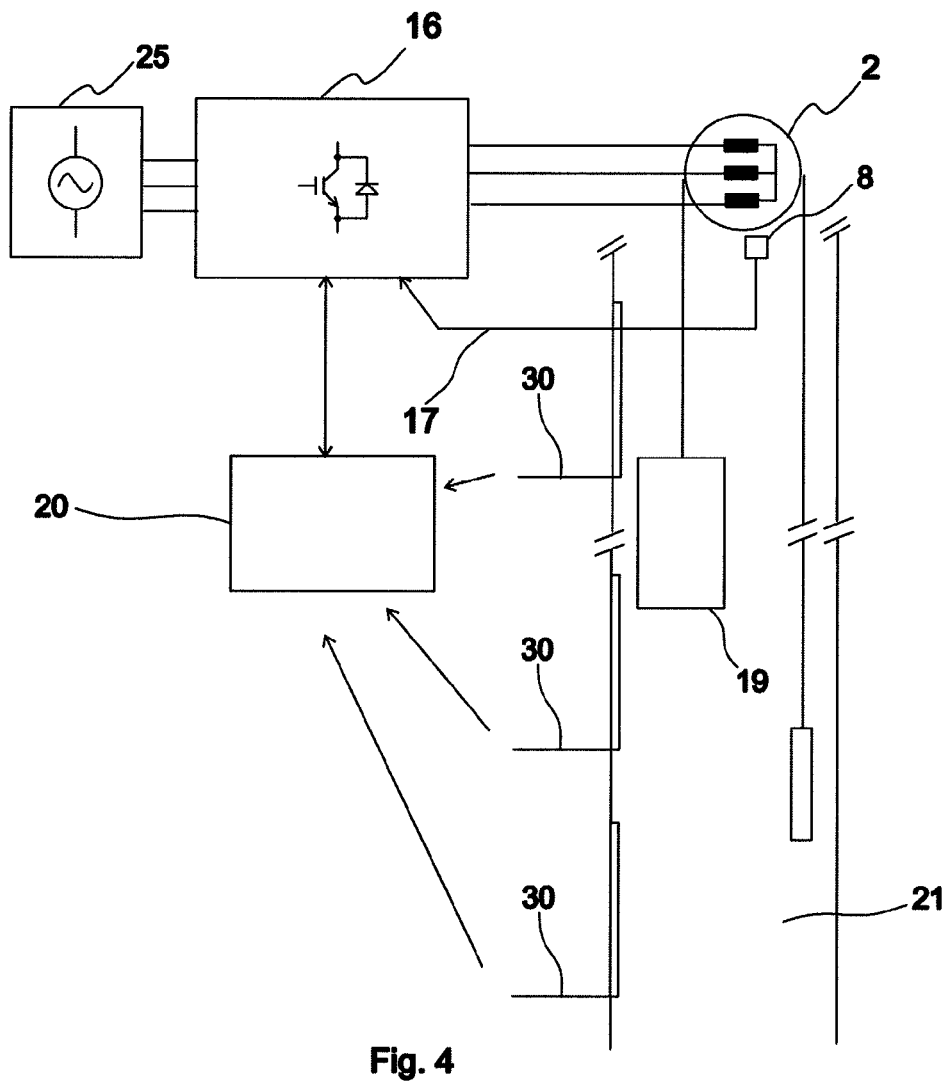

FIG. 4 represents an elevator system 18 with an electric drive 15 e.g. according to the embodiment example in FIG. 3 fitted in it for controlling the movement of the elevator car 19. In the elevator system 18, an elevator car 19 and a counterweight are suspended in an elevator shaft 21 by ropes running over the drive sheave of the elevator hoisting machine 2. Here the elevator hoisting machine 2 is also placed in the elevator shaft 21, in the immediate vicinity of an elevator shaft wall. The elevator hoisting machine 2 is of a discoid and as flat a design as possible, so that it takes up a minimal space in the direction of movement of the elevator car 19 in the elevator shaft 21. Space saving has been achieved by replacing an absolute encoder fitted on the rotary axle of the hoisting machine 2 with a combination of a magnetic band and reader 8 according to the invention.

The elevator car 19 is moved in the elevator shaft 21 by the hoisting machine 2. Power is supplied to the elevator hoisting machine 2 from the electricity network 25 by a frequency converter 16. For the control of the torque and motion of the hoisting machine, the measurement signal from the magnetic band reader 8 is passed to the frequency converter 16 over a data transfer connection 17 between the reader 8 and the frequency converter 16.

An elevator control unit 20 calculates for the elevator car 19 the velocity profile according to which the elevator car 19 is to be moved in the elevator shaft 21. This is one of the reasons why the elevator control unit 20 needs know the position along the elevator shaft 21 at which the elevator car 19 is located at each instant of time. In this embodiment of the invention, the elevator control unit 20 calculates the position of the elevator car 19 in the elevator shaft by using for position calculation the data obtained from the magnetic band reader 8 indicating the position and/or movement of the rotor of the elevator hoisting machine. The elevator car position calculated from the position and/or movement data of the rotor of the hoisting machine is corrected at the door zones of the elevator shaft 21, using measurement data obtained from door zone sensors 30.

The invention has been described above with reference to a few embodiment examples. It is obvious to a person skilled in the art that the invention is not exclusively limited to the embodiments described above, but that many other embodiments are possible within the scope of the inventive concept defined in the claims.

The invention claimed is:

1. A hoisting machine, comprising:
   a rotating part comprising a drive sheave rotatably mounted on a body part of the hoisting machine;
   a drive-sheave protection plate, wherein the drive-sheave protection plate is secured to the body part of the hoisting machine and extends to a side of the drive sheave, so that the drive sheave is housed in a space remaining between the protection plate and the body part; and
   a measuring arrangement comprising:
   a magnetic band, magnetic property of said magnetic band being implemented that the magnetic property varies in a longitudinal direction of the band, wherein the magnetic band is attached to the rotating part, so that the magnetic band is fitted to revolve about a rotational axis of the rotating part, and
   a reader which senses the magnetic property varying in the longitudinal direction of the magnetic band, said reader being mounted on the drive-sheave protection plate in the immediate vicinity of the magnetic band.

2. The hoisting machine according to claim 1, wherein the drive sheave is hollow, and the magnetic band is fitted inside the hollow drive sheave.

3. The hoisting machine according to claim 1, wherein the drive sheave is supported on the body part of the hoisting machine via a bearing, and said bearing is mounted in a bearing housing integrated in a same body with the drive sheave.

4. The hoisting machine according to claim 3, wherein the bearing housing is fitted inside the hollow drive sheave.

5. The hoisting machine according to claim 3, wherein the bearing housing is provided with a machined mounting surface for the attachment of the magnetic band.

6. The hoisting machine according to claim 1, wherein the magnetic band is attached to a separate mounting ring.

7. An elevator system, comprising the hoisting machine according to claim 1 for moving an elevator car in an elevator shaft.

* * * * *